United States Patent [19]

Berger et al.

[11] 4,228,864
[45] Oct. 21, 1980

[54] AUTOMATIC APPARATUS FOR WEIGHING AND EMPTYING A PRODUCT CONTAINED IN A CONTAINER PROVIDED WITH A COVER OR LID

[75] Inventors: Guy F. Berger, Cherbourg; Jacques Salom, Beaumont-Hague, both of France

[73] Assignee: Commissariat a l'Energie Atomique, Paris, France

[21] Appl. No.: 15,623

[22] Filed: Feb. 27, 1979

[30] Foreign Application Priority Data

Mar. 1, 1978 [FR] France ................. 78 05866

[51] Int. Cl.² ................. G01G 19/00; B65B 21/02
[52] U.S. Cl. ................. 177/145; 414/411
[58] Field of Search ........ 177/145, 146; 414/411

[56] References Cited
U.S. PATENT DOCUMENTS

| | | | |
|---|---|---|---|
| 2,641,459 | 6/1953 | McHale et al. | 177/145 |
| 2,990,073 | 6/1961 | Textor | 414/411 X |
| 3,263,842 | 8/1966 | Holstein | 414/411 |
| 3,539,029 | 11/1970 | Bopp et al. | 177/145 |
| 3,910,364 | 10/1975 | Baker | 177/145 |
| 3,991,619 | 11/1976 | Appleford et al. | 177/145 X |
| 4,024,962 | 5/1977 | Cheek et al. | 177/145 X |

*Primary Examiner*—George H. Miller, Jr.
*Attorney, Agent, or Firm*—Kerkam, Stowell, Kondracki & Clarke

[57] ABSTRACT

Automatic apparatus for the weighing and emptying of a product contained in a container equipped with a cover, wherein it comprises means for bringing the container onto a manipulating area, means for grasping the container, bringing it onto a weighing apparatus and placing it in front of a cover manipulating mechanism, said means being controlled by jacks, means for placing the container in a cover manipulating mechanism and for engaging it in a product emptying mechanism, said means being controlled by jacks and the emptying of the product being effected by turning over the container, electrical synchronization means able to control the means and mechanisms described hereinbefore in a first direction in such a way that the container is brought onto the manipulating area, grasped so as to bring it onto a weighing area, placed in the manipulating mechanisms so that the cover is removed, engaged in the product emptying mechanism, then so that the said means and mechanisms are controlled in a second direction opposite to the first direction in such a way that the container is disengaged from the emptying mechanism, is placed in the manipulating mechanism so that the cover is placed back on the container and so that the container is grasped and returned onto the weighing apparatus and then is returned to the manipulating area.

The apparatus can be used whenever it is necessary to manipulate dangerous or contaminated products and is particularly suitable for use in nuclear or chemical installations.

9 Claims, 3 Drawing Figures

AUTOMATIC APPARATUS FOR WEIGHING AND EMPTYING A PRODUCT CONTAINED IN A CONTAINER PROVIDED WITH A COVER OR LID

BACKGROUND OF THE INVENTION

The present invention relates to an automatic apparatus for weighing and emptying a product contained in a container provided with a cover or lid. This apparatus can be used in all cases where the product contained in the container constitutes a hazard for personnel required to manipulate or handle it. This is frequently the case, for example in nuclear or chemical plants. This manipulation often consists of on the one hand weighing a product contained in the container and on the other of emptying said product into a treatment tank. To prevent any accident this manipulation is generally remotely performed within a biological enclosure in such a way as to prevent any danger of the contamination of personnel required to perform the handling operation.

Apparatus are known which permit the manipulation of containers and products within a sealed enclosure. Such apparatus generally comprise articulated arms at the end of which fingers make it possible to remotely perform the manipulations which would be carried out by the human hand if it was not a question of dangerous products located within an enclosure. These articulated arms and fingers are generally operated by an operator who is outside the enclosure in such a way that they are operated either mechanically or electromechanically. Thus, on a remote control basis the operator must carry out all the manipulations which would have been done by hand if the product in question was not dangerous. In the case where the manipulation comprises on the one hand weighing the product contained in the container and on the other emptying it into a tank the operator must firstly bring the product contained in a container onto the scale of a balance located within the enclosure. He must then bring the container above an emptying tank in order to empty the product into it, then return the empty container to the scale of the balance to establish the weight of the product previously contained in the container by means of a double weighing process. The manipulations carried out with such apparatus are long and difficult. Thus, the operator, even if in possession of top-quality articulated equipment cannot work as quickly as if the manipulations were carried out manually. Moreover, due to the fact that remote operation is necessary handling difficulties can occur, such as the overturning of the product outside the tank, problems in removing the cover on the container or in replacing said cover which the operator may inadvertently have allowed to slip alongside the container. In nuclear installations the containers generally contain radioactive products, whereby said products and said container are often very heavy making it even more difficult for an operator at a distance therefrom to move the containers, remove the cover, empty them, weigh the product contained therein, etc.

BRIEF SUMMARY OF THE INVENTION

The problem of the present invention is to obviate these disadvantages and more particularly to provide an automatic apparatus permitting the weighing and emptying of a product contained in a container fitted with a cover. This entirely automatic apparatus obviates any manipulating error and makes it possible to weigh and empty dangerous heavy products contained in containers, which are themselves very heavy.

According to the invention this problem is solved by an automatic apparatus for the weighing and emptying of a product contained in a container fitted with a cover, wherein it comprises means for bringing the container into a manipulating area, means for grasping the container, bringing it onto a weighing apparatus and placing it in front of a mechanism for handling the cover, means for placing the container in the mechanism for handling the cover and for engaging it in a mechanism for emptying the product and synchronisation means suitable for controlling the above-mentioned means and mechanisms in a first direction so that the container is brought into the manipulating area, then grasped to be brought into the weighing area, placed in the manipulating mechanisms so that the cover is removed, engaged in the product emptying mechanism and then so that said means and mechanisms are controlled in a second direction opposite to the first direction in such a way that the container is disengaged from the emptying mechanism, placed in the manipulating mechanism so that the cover is replaced on the container and so that the container is grasped and brought onto the weighing apparatus before being returned to the manipulating area.

According to an advantageous feature of the apparatus the means permitting the grasping of the container to bring it onto the weighing apparatus and for placing it in front of the cover manipulating mechanism comprise a grasping jack provided with gripping means and controlled by synchronisation means in such a way that the container is grasped in the manipulating area, brought to the weighing area prior to the removal of the cover and the emptying of the product, then brought to the weighing area on the manipulating area after emptying the product and closing the container by the cover.

According to another feature of the invention the grasping jack is mounted on the frame associated with a vertical jack able to raise the frame prior to weighing the full container, lower the frame for placing the container on the weighing apparatus, raise the frame after weighing, lower the frame before placing in the manipulating mechanism for the removal of the cover and before placing in the emptying mechanism, then again raise the frame after emptying and closing the container by means of the cover, lower the frame when the container faces the weighing apparatus, raise the frame after weighing the empty container and then lower the frame when the container is brought onto the manipulating area, said grasping jack being controlled by the synchronisation means.

BRIEF DESCRIPTION OF THE DRAWINGS

The invention will be described in greater detail hereinafter with reference to non-limitative embodiments and the attached drawings, wherein show.

DETAILED DESCRIPTION OF THE PREFERRED EMBODIMENTS

Figure 1:
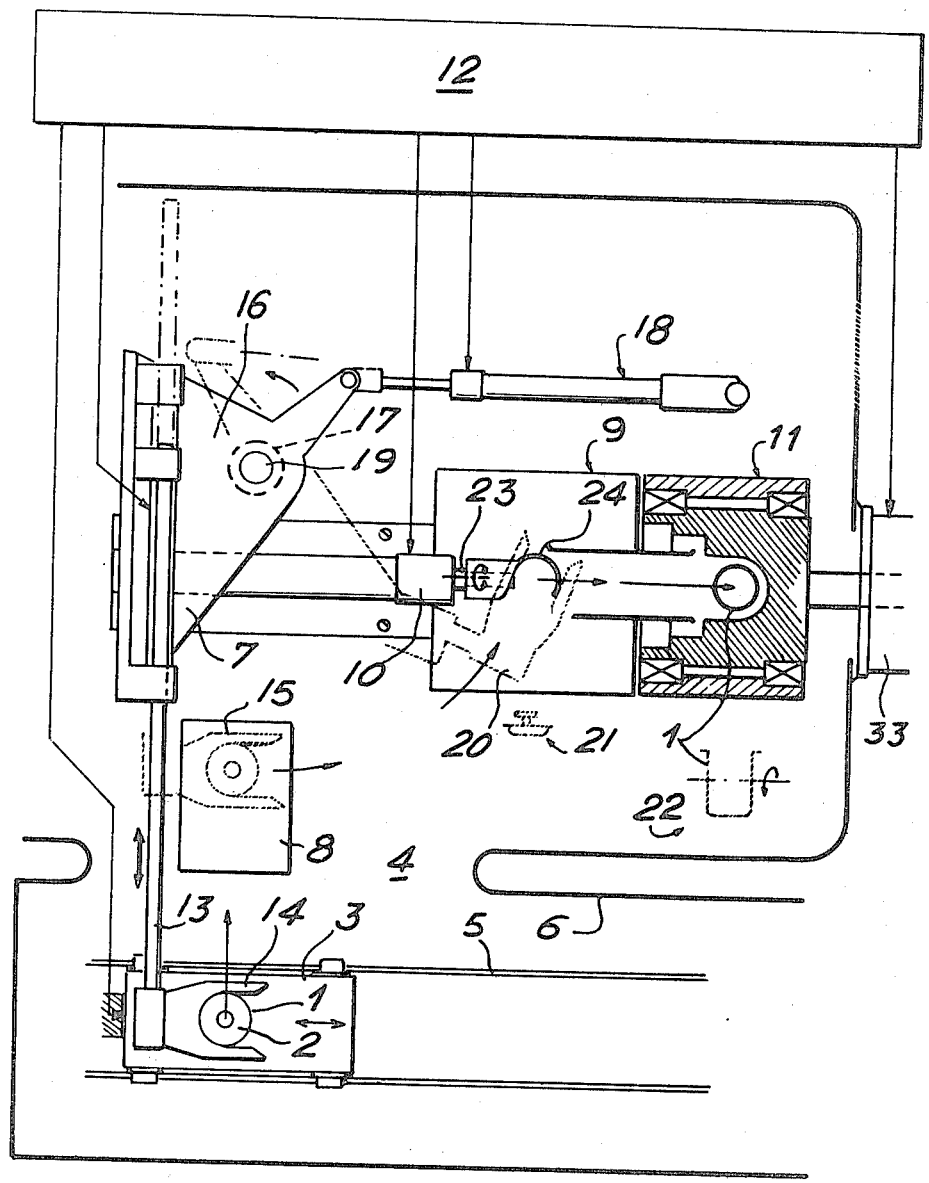
FIG. 1 a diagrammatic plan view of the apparatus according to the invention.

FIG. 1 shows a diagrammatic plan view of the apparatus according to the invention which permits the automatic weighing and emptying of a product contained in a container 1 equipped with a cover 2. This apparatus comprises means 3 for bringing the container onto a manipulating area 4 and which comprise for example a carriage which can travel on rails 5. The carriage and the various means which will be described hereinafter are contained in an enclosure 6, for example a biological enclosure. Means 7 are provided for grasping the container, bringing it onto a weighing apparatus 8 and placing it in front of a mechanism 9 permitting the manipulation of cover 2. The apparatus also comprises means 10 for placing the container in a mechanism 9 for manipulating the cover and for engaging it in a product emptying mechanism 11. Synchronisation means 12 are provided for controlling relays acting on the above-described means and mechanisms in a first direction in such a way that the container is brought onto the manipulating area 4 by a carriage 3, is then grasped by means 7 so that it is brought into the weighing area 8, then placed in the manipulating mechanism 9 where the cover is removed and then engaged in the product emptying mechanism 11. These synchronisation means then control the previously described means and mechanisms in a second direction, which is opposite to the first direction, in such a way that the empty container is disengaged from the emptying mechanism 11, then returned to the cover manipulating mechanism 9 making it possible to again place the cover on the container and then return the container to weighing apparatus 8, followed by the return to the starting point on carriage 3.

The means 7 permitting the grasping of the container so as to bring it on the weighing apparatus 8 and for placing it in front of the manipulating mechanism 9 of cover 2 comprise a grasping jack 13 equipped at its free end with gripping means 14, for example in the form of an open C. When the carriage 3, which transports the container 1, arrives in front of the gripping means 14 synchronisation means 12 control the jack 13 in such a way that the latter is retracted into position 15, when the container is placed on the weighing apparatus 8. The grasping jack 13 is mounted on a frame 16 associated with a vertical jack 17 permitting the raising of the frame when the container is grasped by the carriage 3, then brought above the weighing apparatus 8. Vertical jack 17 also permits the lowering of the frame to place the container on the weighing apparatus. The frame is then raised after the container containing the product has been weighed and is then lowered again before the container is placed in the cover manipulating mechanism. Frame 16 is also associated with a horizontal jack 18 which makes it possible to pivot the frame 16 about a shaft 19. This pivoting of the frame brings the container into position 20 where it faces the manipulating mechanism 9 for cover 2. When the container faces this mechanism vertical jack 17 lowers frame 16 so that the container can be engaged in the cover manipulating mechanism.

The means 10 permitting the placing of the container in the cover manipulating mechanism 9 and the engaging of said container in the product emptying mechanism 11 comprise a jack equipped with gripping means, which will be described hereinafter. This jack and these gripping means make it possible to grasp the container in position 20 when jack 13 has been disengaged to return to position 15. The container is then brought into the cover manipulating means 9 in such a way that the cover is removed. Means 10 then engage the container in the product emptying mechanism 11. When the product has been emptied the means 10 return the container to the cover manipulating mechanism so that the container can be sealed. Grasping jack 13 then takes up the container again in position 20 to return it to the weighing area 8. The removed cover is shown at 21 and the empty container 1 has been shown in position 22.

The synchronisation means 12, which are not shown in detail, comprise in per se known manner for example timers acting on electromechanical relays connected to each of the jacks of the various means of the present apparatus. These relays control the extension or retraction of the jacks as a function of the handling process to be performed.

Figure 2:
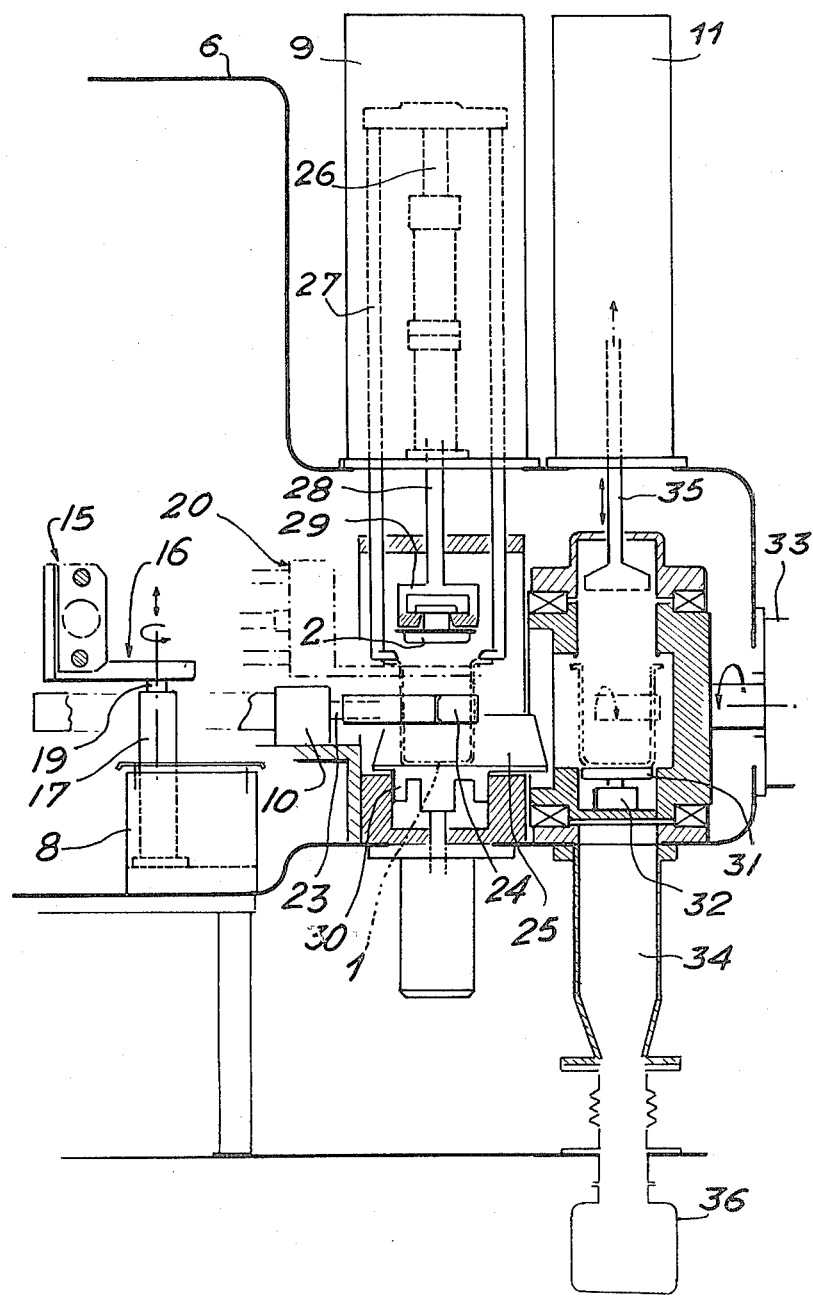
FIG. 2 a diagrammatic sectional view of means permitting the removal and the replacement of the cover on the container.

FIG. 2 diagrammatically shows the cover manipulating means 9 and the means 11 permitting the emptying of the product into a tank 36. FIG. 2 shows frame 16 pivoting about shaft 19 in order to occupy the position 20 facing the cover manipulating mechanism, followed by lowering or raising due to jack 17. It also shows the weighing apparatus 8 on which rests the container, either before emptying or after emptying the product. Means 10 permitting the container to be brought into the cover manipulating mechanism are shown in greater detail. They comprise a jack 23 equipped with gripping means 24 and make it possible to bring the container 1 into the manipulating mechanism 9 of cover 2 or into the product emptying mechanism 11 for returning the container in the rearwards direction when the product has been emptied and when the cover has been refitted. The cover manipulating means 9 comprise a base 25 associated with a first jack 26 maintaining the container on base 25 by means of arms 27. This base is also associated with a second jack 28 and gripping means 29 adapted to the shape of the cover and making it possible either to remove or to replace the cover 2 on container 1. FIG. 2 shows a further jack 30 permitting the raising of base 25 in such a way as to reinforce the action of jack 26 ensuring the better maintaining in place of the container.

When cover 2 is removed due to the upward displacement of jack 28 the container is forced by jack 23 into emptying mechanism 11.

The cover manipulating mechanism 11 comprises a base 31 associated with a jack 32 which, on being raised, maintains the container in the emptying mechanism. This base is also associated with horizontally axed rotation means 33, which pivot the container about this axis. During the pivoting of the container it empties downwards into chute or channel 34 and then into tank 36. After emptying the product the rotation means 33 turn over the container in such a way that its opening is directed upwards. A suction system 34, which can be lowered and then raised, suck out any product which may have been left in the container after emptying. Following the suction operation jack 23 returns the container to the cover manipulating means where the container is resealed. For ease of representation the drawing does not show the synchronisation means and the relays which act on the various jacks.

Figure 3:
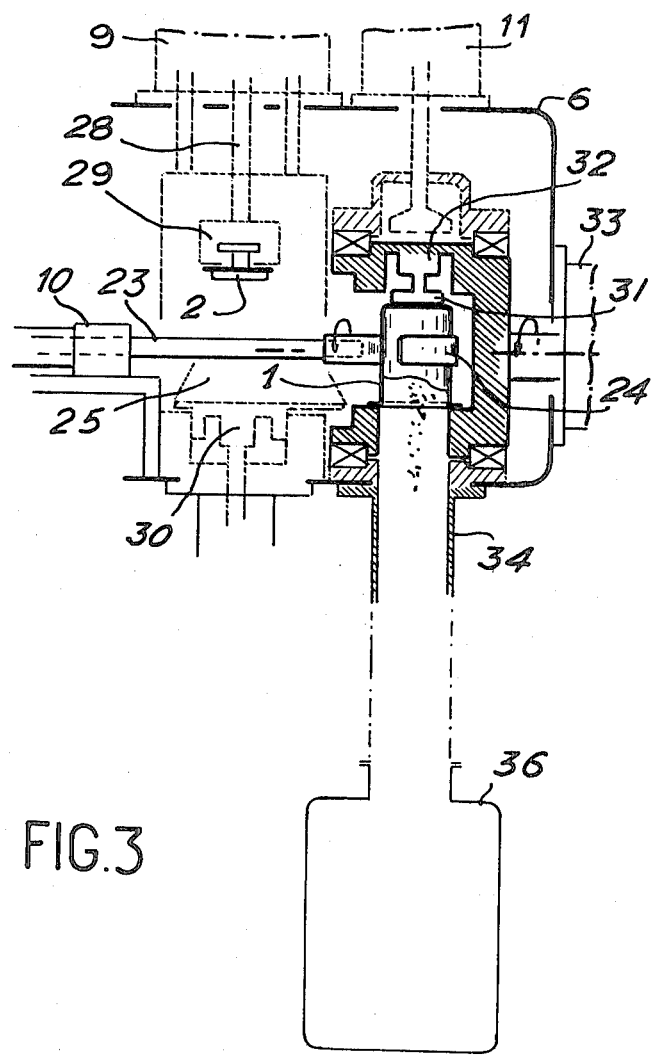
FIG. 3 a diagrammatic sectional view of the mechanism permitting the emptying of the product into a tank.

FIG. 3 shows the cover manipulating means 9 and the product emptying means 11 at the time where cover 2 has been removed and the container has been turned over in such a way that the product is discharged via chute 34 into tank 36. The gripping means 24 located at the end of jack 23 can pivot round the latter when the container is turned over to empty the product.

The synchronisation means 12, the relays and the various jacks act in the following manner. When the carriage 3 brings container 1 in front of gripping means 14 vertical jack 17 raises the container so as to disengage it from the carriage. Jack 13 is retracted and the container is then brought above the weighing apparatus 8 in position 15. Frame 16 is then raised by the vertical jack 17 so as to disengage the container from the weighing area and then this frame pivots about shaft 19 under the action of jack 18, the container then occupying position 20 facing the cover manipulating means 9. The frame 16 is then lowered by means of vertical jack 17 in such a way that the container is placed on base 25 of manipulating means 9. The frame then pivots in the opposite direction under the action of jack 18 and gripping means 14 again occupy position 15. The container 20 is then disengaged and can be taken up by means 10 enabling said container to be brought into the manipulating means 9 where it is kept in place by jacks 26 and 30 and where cover 2 is removed. When the cover has been removed jack 23 and gripping means 24 make it possible to engage the container in emptying means 11. The container is held in position in these emptying means by the base 31 raised by jack 32. The container is then turned over by the rotation means 33 and the product is emptied. The container is then turned over again by the same means in such a way that its opening is directed upwards. Following turning over of the container jack 23 returns it to the cover manipulating means 9 in which it is held by jacks 30 and 27. Jack 28 is lowered and cover 2 again seals the container 1. Subsequently jacks 27, 28 and 30 are raised and the container is freed from the manipulating means 9. Base 16 then pivots in the opposite direction into position 20 about shaft 19 due to jack 18, so that the gripping means 14 again grip the container 1. Jack 23 is released and the vertical jack 19 raises the container. Frame 16 pivots so as to bring jack 13 into position 15 above the scale of weighing apparatus 8. Frame 16 is then lowered by means of the vertical jack 17 and the empty container is then deposited on the weighing apparatus 8. As the container has been weighed full and then empty it is easy to establish the quantity of product contained therein. After the latter weighing operation frame 16 is raised by means of jack 17, then jack 13 is extended so that the container is placed above carriage 3. Frame 16 is lowered by jack 17 and the container is placed on carriage 3. The carriage is then moved rearwards in order to release the empty container towards the outside of the enclosure where it can again be filled or manipulated.

Weighing apparatus 8 can obviously be provided with means for the automatic marking of the different weighing operations.

For ease of representation FIG. 3 does not show the synchronisation means and the relays controlling the various jacks.

The apparatus according to the invention makes it possible to achieve the objectives defined hereinbefore. It makes it possible to automatically perform on the one hand the weighing and on the other the emptying of a container containing a product which is contaminated and dangerous for the operator. This manipulation is realised within a biologically protected enclosure and the apparatus which comprises jacks makes it possible to manipulate very heavy containers containing products which are also very heavy.

The invention is not limited to the embodiments described and represented hereinbefore and various modifications can be made thereto without passing beyond the scope of the invention.

What is claimed is:

1. An automatic apparatus for the weighing and emptying of a product contained in a container equipped with a cover, wherein it comprises means for bringing the container onto a manipulating area, means for grasping the container, bringing it onto a weighing apparatus and placing it in front of a cover manipulating mechanism, said means being controlled by jacks, means for placing the container in a cover manipulating mechanism and for engaging it in a product emptying mechanism, said means being controlled by jacks and the emptying of the product being effected by turning over the container, electrical synchronisation means able to control the means and mechanisms described hereinbefore in a first direction in such a way that the container is brought onto the manipulating area, grasped so as to bring it onto a weighing area, placed in the manipulating mechanisms so that the cover is removed, engaged in the product emptying mechanism, then so that the said means and mechanisms are controlled in a second direction opposite to the first direction in such a way that the container is disengaged from the emptying mechanism, is placed in the manipulating mechanism so that the cover is placed back on the container and so that the container is grasped and returned onto the weighing apparatus and then is returned to the manipulating area.

2. An apparatus according to claim 1, wherein the means permitting the grasping of the container to bring it onto the weighing apparatus and for placing it in front of the cover manipulating mechanism comprise a grasping jack provided with gripping means and controlled by synchronisation means in such a way that the container is grasped in the manipulating area, brought to the weighing area prior to the removal of the cover and the emptying of the product, then brought to the weighing area on the manipulating area after emptying the product and closing the container by the cover.

3. An apparatus according to claim 2, wherein the grasping jack is mounted on the frame associated with a vertical jack able to raise the frame prior to weighing the full container, lower the frame for placing the container on the weighing apparatus, raise the frame after weighing, lower the frame before placing in the manipulating mechanism for the removal of the cover and before placing in the emptying mechanism, then again raise the frame after emptying and closing the container by means of the cover, lower the frame when the container faces the weighing apparatus, raise the frame after weighing the empty container and then lower the frame when the container is brought onto the manipulating area, said grasping jack being controlled by the synchronisation means.

4. An apparatus according to claim 3, wherein the means for placing the container in the cover manipulating mechanism and for engaging it in the product emptying mechanism comprise an engagement jack equipped with gripping means able to grip the container after weighing, bring it into the cover manipulating mechanism for the removal of the cover, then bring the container into the product emptying mechanism, followed by its return to the manipulating mechanism to enable it to be sealed by the cover following emptying, said jack being controlled by the synchronisation means.

5. An apparatus according to claim 4, wherein the frame is associated with a horizontal jack which pivots about a vertical axis in order to move the container from a position facing the weighing means into a position facing the cover manipulating mechanism, said jack being controlled by the synchronisation means.

6. An apparatus according to claim 5, wherein the cover manipulating mechanism comprises a base associated with a first jack able to maintain the container on the base and a second jack equipped with gripping means able to remove or replace the cover, said two jacks being controlled by the synchronisation means.

7. An apparatus according to claim 5, wherein the product emptying mechanism comprises a base associated with a jack able to maintain the container on the base and horizontally axed rotation means for pivoting the container about said axis in such a way as to empty it downwards, followed by the turning over of the container so that it can be brought to the cover manipulating mechanism for the sealing of the container by the cover, said jack and said rotation means being controlled by the synchronisation means.

8. An apparatus according to claim 7, wherein the means for bringing the container onto a manipulating area comprise a movable carriage on which is placed the container, said carriage moving towards the means permitting the grasping thereof to bring it onto the weighing apparatus.

9. An apparatus according to claim 8, wherein the synchronisation means comprise relays associated with each jack and means for rotating the emptying mechanism, said relays being controlled by timing circuits regulated so as to permit the synchronisation of the various movements of the container.

* * * * *